United States Patent [19]

Miller et al.

[11] Patent Number: 4,553,900

[45] Date of Patent: Nov. 19, 1985

[54] APPARATUS FOR REMOVING SPRINKLER PIPE FROM A FIELD

[75] Inventors: William D. Miller; Omar L. Stiff, both of Brawley; Benardo Mercurio, El Centro, all of Calif.

[73] Assignee: William D. Miller, Inc., Brawley, Calif.

[21] Appl. No.: 484,884

[22] Filed: Apr. 14, 1983

[51] Int. Cl.$^4$ ............................................... F16L 1/00
[52] U.S. Cl. .................................... 414/745; 198/456; 198/698; 198/803.15; 280/415 R; 405/154; 414/747
[58] Field of Search ................. 414/14, 501, 528, 537, 414/538, 559, 571, 745, 747; 198/456, 655, 698, 699, 822; 405/154; 280/415 R, 415 A

[56] References Cited

U.S. PATENT DOCUMENTS 915,866  3/1909  Lamberty ............................. 414/14
3,470,997 10/1969  Trounce ............................... 198/456
3,721,461  3/1973  Nelsen ............................. 280/415 R
4,093,082  6/1978  Goodsell ......................... 405/154 X Primary Examiner—Robert G. Sheridan
Attorney, Agent, or Firm—Flehr, Hohbach, Test, Albritton & Herbert

[57] ABSTRACT

An apparatus for removing sprinkler pipe from a field in which the sprinkler pipe is disposed in rows in the field with the sprinkler pipe in each row being formed of serially connected lengths of sprinkler pipe having an elongate framework. Ground engaging means is carried by the framework. First and second sprockets are rotatably mounted on the framework in positions spaced apart longitudinally of the framework. An endless chain is mounted on the sprockets. A drive motor is provided. Control means for connecting and disconnecting the drive motor is provided to one of said sprockets. At least one attachment is carried by the chain. The attachment is adapted to engage lengths of the sprinkler pipe whereby as the chain is advanced the length of pipe connected there is withdrawn from the field and carried onto the elongate framework.

12 Claims, 6 Drawing Figures

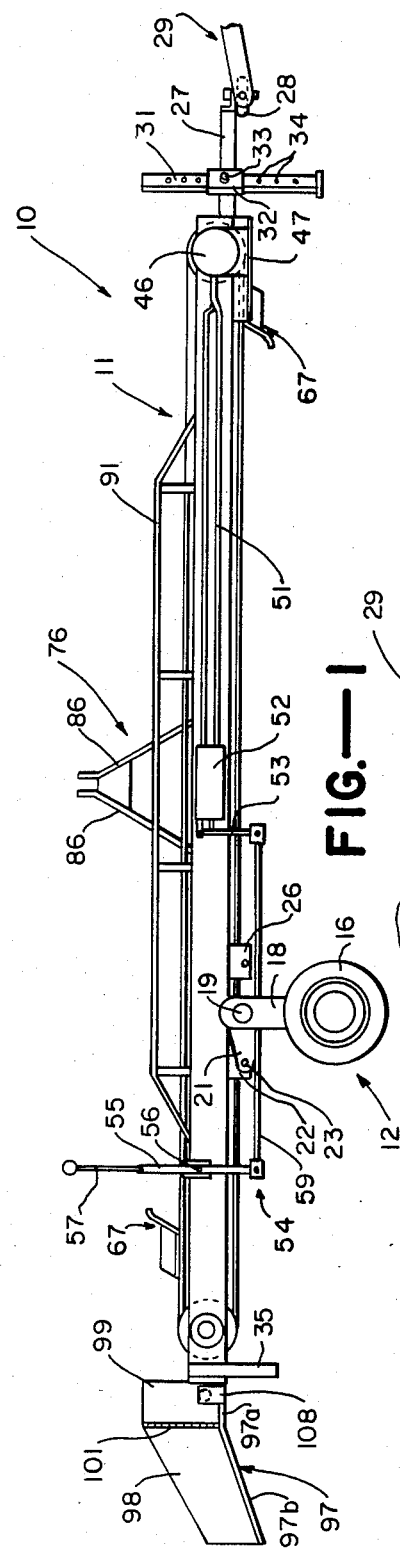
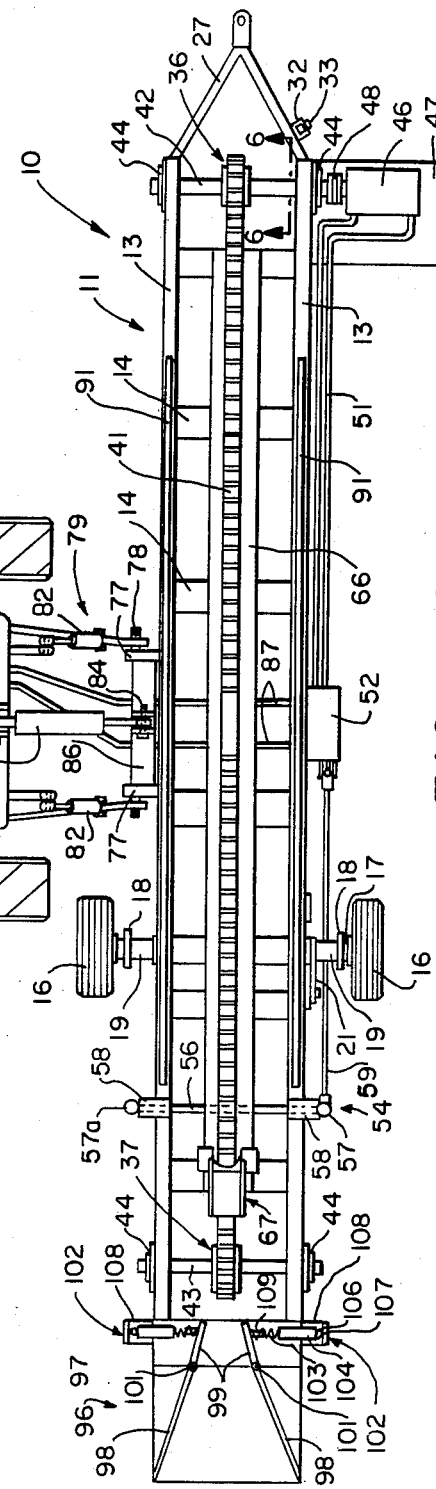

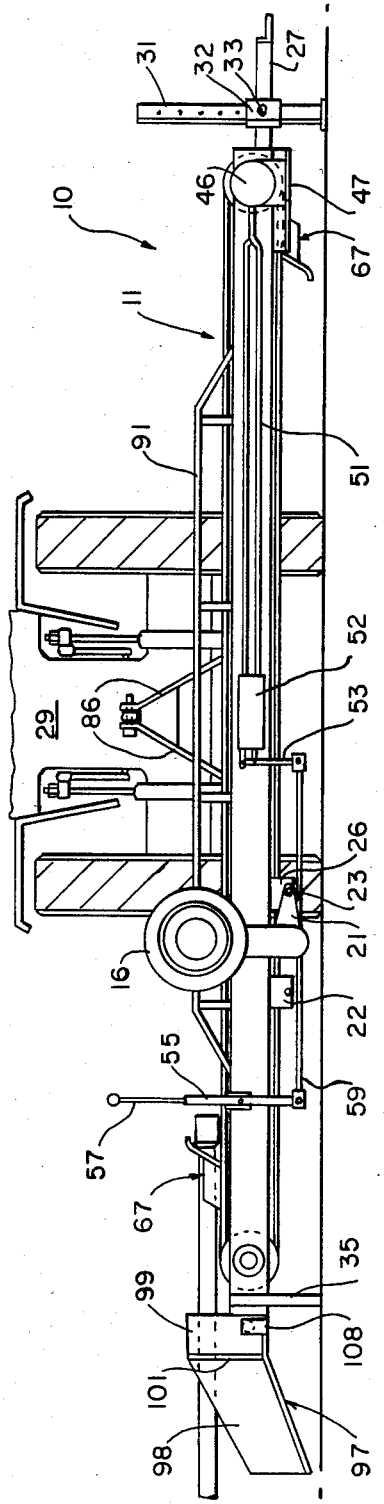
FIG.—3
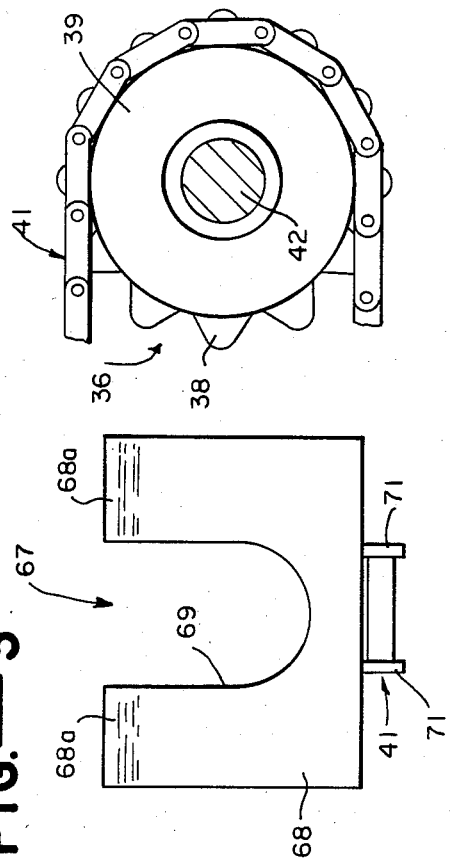
FIG.—6
FIG.—5
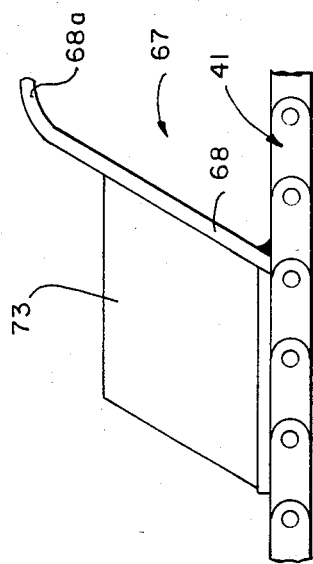
FIG.—4

APPARATUS FOR REMOVING SPRINKLER PIPE FROM A FIELD

This invention relates to an apparatus and method for removing sprinkler pipe from a field.

In vegetable fields, it is the practice to manually install sprinkler pipe in the fields after the fields have been planted by planting the seeds in raised beds with furrows therebetween. The sprinkler pipe is disposed on sprinkler lines in the furrows in the field. The sprinkler lines are formed by serially connected lengths of sprinkler pipe. The sprinkler pipe is utilized to irrigate the ground to cause the seeds to germinate. After the seeds have germinated and the plants begin appearing in the field, water is permitted to run directly into the furrows including the furrows in which the sprinkler lines are disposed. After the plants are large enough to receive their water supply from the water in the furrows, the sprinkler lines can be pulled. Difficulty, however, occurs in that the fields must be permitted to dry so that they are dry enough for tractors and trailers and the workers to enter the fields to pull the pipe. Alternatively, the workers must work in wet fields which is very difficult and time consuming because the workers must carry the pipe to the ends of the furrows where it can be picked up and placed on trailers. The alternative is to permit the field to dry sufficiently to permit the tractors and trailers to enter the field. However, this can take as many as eight to ten days or more before this can occur. This necessitates the farmer purchasing additional sprinkler pipe for irrigating other fields because of the inability to remove the sprinkler pipe from the already sprinkler wetted fields. Therefore, there is a need for an apparatus and method for removing sprinkler pipe from fields while the fields are still wet.

In general, it is an object of the present invention to provide an apparatus and method for removing sprinkler pipe from the fields while the fields are still wet.

Another object of the invention is to provide an apparatus and method of the above character which permits sprinkler pipe to be removed very rapidly from wet fields.

Another object of the invention is to provide an apparatus and method of the above character which eliminates the necessity of men entering the wet fields which could cause compacting of the soil and injury to the plants in the field.

Another object of the invention is to provide an apparatus and method of the above character which are particularly labor saving.

Another object of the invention is to provide an apparatus and method which are relatively inexpensive.

Another object of the invention is to provide an apparatus and method of the above character which are relatively safe.

Additional features and objects of the invention will appear from the following description in which a preferred embodiment is set forth in detail in conjunction with the accompanying drawing.

FIG. 1 is a side elevational view of an apparatus for removing sprinkler pipe from a field incorporating the present invention with the wheels engaging the ground for movement from one location to another and being drawn by a tractor.

FIG. 2 is a top plan view of the apparatus shown in FIG. 1 with the wheels in engagement with the ground and being connected to a three-point hitch of a tractor for operation of the same.

FIG. 3 is a side elevational view similar to FIG. 1, but showing the apparatus with the wheels in a raised position in a position for removing sprinkler pipe from the field.

FIG. 4 is an enlarged side elevational view of the pipe engaging attachment secured to the chain for engaging an end of the pipe to be removed from the field.

FIG. 5 is a front elevational view of the attachment shown in FIG. 4.

FIG. 6 is an enlarged partial cross-sectional view taken along the line 6—6 of FIG. 2 showing one of the chain driving sprockets.

The apparatus for removing sprinkler pipe from a field is for use in applications in which the sprinkler pipe is disposed in rows in the field with the sprinkler line in each row being comprised of a plurality of the serially connected lengths of sprinkler pipe. The apparatus consists of an elongate framework. Ground engaging means is carried by the framework. First and second spaced apart sprockets are rotatably mounted in the framework and are spaced apart longitudinally of the framework. An endless chain is mounted on the sprockets. Motive means is provided for driving at least one of the sprockets. Control means is provided for connecting and disconnecting the motive means from a driven sprocket. A pipe engaging attachment is carried by the chain and serves to engage a length of pipe whereby as the chain is advanced the length of pipe attached thereto is withdrawn from the field and carried onto the elongate framework. As soon as this has occurred, the motive means is stopped and the length of pipe on the elongate framework is disconnected from the sprinkler pipe line being withdrawn from the field and is removed from the framework. The motive means is again operated to cause the next length of pipe to be drawn onto the elongate framework after which the same procedure is repeated until the entire sprinkler line has been removed from the field. Thereafter the apparatus is moved to the next sprinkler line in the field and the same operations are repeated. This procedure is continued until all of the sprinkler pipe has been removed from the field.

As shown in the drawings, the apparatus 10 for removing sprinkler pipe from a field consists of an elongate framework 11 which is supported by ground engaging means 12. The elongate framework 11 is comprised of first and second spaced apart generally parallel main frame members 13. The members 13 can be formed of a suitable material such as elongate box shaped steel members having suitable dimensions such as two inches by six inches. The frame members 13 are maintained in spaced apart parallel positions by a plurality of generally parallel cross members 14 spaced apart longitudinally of the frame members 13 and secured thereto by suitable means such as welding.

The ground engaging means 12 consists of a pair of rubber tired wheels 16. The wheels 16 are mounted on spindles 17 carried by arms 18. The arms 18 are secured or connected to stub shafts 19 which are mounted on the lower extremities of the elongate framework 11. Arms 21 are secured to tub shafts 19 and the arms 18 so they move with the arms 18. The ends of the arms 21 are adapted to be secured in two positions relative to the frame members 13 spaced 180° apart. For example, when the wheels 16 are to be in a ground engaging position, the arms 21 are removably secured to depending links 22 by pins 23. The links 22 are secured to the frame members 13 by suitable means such as welding. The pins 23 can be retained in desired positions by suitable means such as cotter keys (not shown). The arms 21 are also adapted to be secured to depending links 26 also secured to the frame members 13 to retain the ground engaging wheels 16 out of engagement with the ground. Thus in one position when the arms 21 are secured to the links 22, the wheels 16 are in engagement with the ground and when the arms are secured to the links 26, the wheels 16 are out of engagement with the ground.

A triangular hitch 27 is secured to the forward extremity of the elongate framework 11 and is adapted to be secured to the drawbar 28 of a tractor 29 or other suitable motive means for moving the apparatus for moving pipe from one location to another. Adjustable jack means is provided for supporting the forward extremity of the elongate framework at a suitable elevation and consists of a vertical member 31 which is adapted to engage the ground and which is slidably mounted in a bracket 32 secured to the hitch 27. The bracket 32 is provided with a pin 33 which is adapted to be inserted in holes 34 spaced vertically of the vertical member 31. In this manner, the front end of the elongate framework 11 can be held in a desired position either with the wheels 16 up or down.

The rear extremity of the elongate framework 11 is provided with a U-shaped bracket 35 depending downwardly therefrom which is also adapted to engage the ground to support the rear extremity of the elongate framework when the wheels 16 are raised out of a ground engaging position.

First and second sprockets 36 and 37 are mounted upon the framework 11 in spaced apart positions. The sprockets 36 and 37 are preferably of the type manufactured by the Durst Company of Beloit, Wis. Such sprockets are provided with, for example, twelve teeth 38 with an annular ring 39 on each side for supporting the elongate endless chain 41 carried thereby. The annular rings 39 serve to reduce wear on the teeth 38 of the sprockets 36 and 37. The chain 41 can be of any suitable type and preferably is of a self cleaning type such as manufactured by Drives Incorporated of Fulton, Ill. The sprockets 36 and 37 are secured to shafts 42 and 43 respectively. The shafts 42 and 43 are rotatably mounted in pillow block bearings 44 mounted on the frame members 13.

Suitable motive means is provided for driving the shaft 42 which drives the sprocket 36 and consists of a conventional hydraulic motor 46 mounted upon large brackets secured to one of the side frame members 13. The hydraulic motor 46 is coupled by a chain coupler 48 of a conventional type. The hydraulic motor 46 can be of the type supplied by Char Lynn of Eaton Corp. of Minneapolis, Minn. The hydraulic motor 46 is supplied with hydraulic fluid through piping 51 which is connected to a conventional four way valve 52. The four way valve is a type which uses a spring return to neutral. The four way valve 52 is provided with a lever arm 53 which is connected to manually operated control means 54. The control means 54 consists of a lever 55 on one side of the framework 11 which is secured to a rod 56 pivotally mounted in sleeves 58 mounted on the main frame members 13. The lever 55 has mounted thereon a detachable handle 57. The lever 55 is pivotally connected to one end of a connecting rod 59 and the other end of the connecting rod 59 is pivotally connected to the lever 53. Another lever (not shown) is secured to the other end of the rod 56 on the other side of the framework 11. It is provided with a detachable handle 57a.

Means is provided for supporting the upper run of the endless chain 41 and consists of an elongate rectangular member 66 which is secured to the cross members 14 by suitable means such as welding. The member 66 is disposed generally equidistant from between the members 13 and is parallel to the members 13. As can be seen, the member 66 extends substantially the entire length between the sprockets 36 and 37. The endless chain 41 has a length which is greater than the length of two lengths of irrigation pipe. Two pipe engaging brackets or attachments 67 are secured to the chain 41. As can be seen in FIGS. 4 and 5, each of the brackets 67 consists of an inclined plate 68 which is provided with a U-shaped centrally disposed opening 69 which is open at the top. As shown, the plate 68 is secured to the chain 41 by welding to links 71 of pair of depending ears 71 of the endless chain 41. As shown particularly in FIG. 4, the plate 68 is mounted in such a manner so that it projects forwardly along the line of the direction of travel of the chain 41. It is also provided with upwardly, forwardly curved portions 68a. Spaced apart rearwardly extending side guide members 73 are secured to the plate 68 on opposite sides of the opening 69 by suitable means such as welding. The plates 68 of the attachments 67 are inclined in such a manner so that the couplings of irrigation pipe will be retained in the attachments 67 and will not move upwardly and become disengaged.

A hitch 76 is mounted on the elongate framework 11 approximately equidistant between the ends of the same. The hitch 76 consists of sidewardly projecting spaced apart ears 77 which are mounted on the outer surface of one of the frame members 13 by suitable means such as welding. Stub shafts 78 are mounted on the ears 77 and extend sideways from the ears 77. The stub shafts 78 are adapted to be secured to a three-point hitch 79 of a conventional type mounted on the wheeled tractor 29. The three-point hitch 79 includes two draw bars 82 which are secured to the stub shafts 78. It also includes a hydraulic actuator 83 which is connected by a pin 84 to a pair of upright members 86 which are secured to the ears 77 by suitable means such as welding.

The four way valve 52 mounted on the elongate framework 11 is provided with hydraulic hoses 87 which are adapted to be secured to the tractor 29. The tractor 29 is provided with a conventional hydraulic system which supplies fluid under pressure to the hoses 87 so that hydraulic fluid under pressure is supplied to the valve 52 which is utilized for controlling the operation of the hydraulic motor 46.

Guard rails 91 are provided on opposite sides of the elongate framework 11 and are mounted upon the frame members 13 by suitable means such as welding.

Pipe guiding means 96 is mounted on the elongate framework 11 near the rear extremity thereof. The pipe guiding means consists of a bottom plate 97. The bottom plate 97 is provided with a planar portion 97a which lies in the same horizontal plane as the elongate framework 97 and also with an adjoining planar portion 97b which is inclined downwardly and rearwardly. The pipe guiding means also includes a pair of pipe guiding members 98 which extend upwardly in vertical directions and which are inclined outwardly and rearwardly. The pipe guiding members 98 are secured to the inclined portion 97b of the bottom plate 97 by suitable means such as welding. The pipe guiding means 96 also includes a pair of wing members 99 which are mounted for movement about vertical axes formed by hinges 101 that are used for securing the wing members 99 to the pipe guiding members 98. Means 102 is provided for yieldably retaining the wing members 99 in positions which lie in planes corresponding to the planes occupied by the pipe guiding members 8. Such means consists of springs 103 which engage the wing members 99 and which are seated in tubular members 104. The tubular members 104 are secured to vertically extending sleeves 106. The sleeves 106 are pivotally mounted upon cap screws 107 carried by brackets 108 mounted upon the bottom plate 7. Rods 109 carried by the wing members 99 extend onto the springs 103 to support the same.

Operation and use of the apparatus for moving sprinkler pipe from a field can now be described in accordance with the method which is utilized. Let it be assumed that a field has been listed to form furrows between raised beds and that the beds have been planted with seeds. Let it also be assumed that in order to aid in germination of the seeds that it is desired to sprinkle the field with water. When this is the case, irrigation pipe of a conventional type is placed in the field so that the lengths of pipe are interconnected to form sprinkler lines of connected lengths of sprinkler pipe which are disposed in the furrows between the raised beds. Let it be assumed that the desired sprinkling has been carried out with the sprinkler pipes and that thereafter, it is desired to immediately remove the sprinkler pipe from the field. Let it also be assumed that it is desired to remove the sprinkler pipe from the end of the field because the field is too wet to enter immediately after sprinkling. This is accomplished by hitching the tractor 29 to the front hitch 27 of the elongate framework 11 and pulling the same into the desired position at the end of the field. In positioning the apparatus, the apparatus is positioned in such a manner so that its longitudinal axis is in alignment with a furrow in which there is disposed a length of sprinkler pipe which is to be withdrawn from the field.

After this has been accomplished, the tractor is disconnected from the hitch 27 and the three-point hitch 79 is connected to the hitch 76 mounted on the side of the elongate framework 11. After the three-point hitch 79 has been connected, the hydraulic controls (not shown) on the tractor are operated to lift the elongate framework 11 up off of the ground so that the wheels 16 are out of engagement with the ground. As soon as this has been accomplished, the wheels 16 are swung into out-of-the-way positions by removing the latch pins 23 and swinging the same counterclockwise so that the wheels 16 are in vertical upstanding positions and with the arms 21 being secured to the links 26 by the latch pins 23. After the wheels 16 have been raised, the elongate framework 11 can be lowered by the three-point hitch 79 so that the stand or bracket 35 comes in to engagement with the ground. To ensure that the front part of the elongate framework 11 remains in an elevated position, the jack-like support member is positioned by the use of a pin 33 disposed in one of the holes 34 to support the framework 11 in a desired elevated position.

The operator then engages the handle 57 to operate the valve 52 to cause operation of the hydraulic motor 46 to advance the chain 41 to a position so that the pipe engaging member or attachment 67 carried by the chain is disposed on the upper side of the endless path of travel of the chain and is disposed near the rear extremity of the elongate framework 11 such as shown in FIGS. 2 and 3. In this position, a length of sprinkler pipe which has not been used in the field is connected to the line which is in the field and then the other end of the same which is provided with a conventional coupling (not shown) is positioned in the pipe engaging member 67 by seating it within the U-shaped slot 69 and having the coupling engage the plate 68 of the member 67. As soon as a length of sprinkler pipe has been positioned in this manner and connected to the sprinkler line in the field, the control valve 52 can be operated by movement of the lever arm 57 to cause hydraulic fluid to be directed to the hydraulic motor 46. Operation of the drive motor advances the chain 41 in a direction in which the upper run travels from the rearward extremity to the forward extremity of the elongate framework 11. As the chain 43 moves, the coupling of the pipe mounted in the member 67 engages the plate 68 and applied force to remove the sprinkler pipe line from the field. The chain 41 is moved until a length of sprinkler pipe is disposed on top of the elongate framework 11 at which time an operator engages the handle 57 to stop operation of the hydraulic drive motor 46.

As soon as movement of the chain 41 has stopped, a workman standing alongside the elongate framework 11 operates the handle 57 to cause a slight reversal of the chain 41 so that the member 67 is out of engagement with the forward extremity of the sprinkler pipe. The sprinkler pipe is then lifted by hand off of the chain and disconnected from the sprinkler line. The length of sprinkler pipe which is removed can either be placed on a trailer which can be towed by the framework 11 as it is towed by the tractor or alternatively, can be moved by the use of a trailer pulled by a separate tractor. After a section of the sprinkler line has been removed, the control lever 57 can again be actuated to move the next member 67 on the chain 41 forwardly until it comes into engagement with the coupling of the next pipe in the sprinkler line of pipes. As soon as this has been accomplished, the controls are operated to advance another length of sprinkler pipe onto the elongate framework 11 after which the same operations as hereinbefore described are performed.

In the operation of the apparatus, the pipe guiding means 96 serves to centrally dispose the pipe so that it is in alignment with the chain 41. The pipe guiding means 96 as hereinbefore explained is formed in such a manner so as to provide a V-shaped throat through which the pipe enters and causes it to be centered over the chain 41. In this connection it should be noted that the pipe guiding means as hereinbefore explained consists of yieldably urged wings which are moved inwardly to engage the pipe and to center the pipe over the chain 41. This is particularly advantageous in centering the pipe sections as they are successively pulled from the field so that the pipe sections are in registration with the members 67 so that the couplings thereon are engaged thereby.

After a line of pipe has been pulled from the field, the framework 11 can be elevated by the use of the three-point hitch and the tractor and apparatus moved so that the apparatus is in alignment with the next furrow having a sprinkler pipe therein to be removed.

This procedure is accomplished repeatedly until the sprinkler pipe has been removed from the field. The removed sprinkler pipe can be utilized in another field. Thus it can be seen that by utilizing such a method, the sprinkler pipe can be pulled from the field as soon as sprinkling has been completed without waiting for the field to dry. The pipe can be used in another field for sprinkling after which the pipe can be removed in a similar manner and used in still another field. This procedure greatly reduces the amount of pipe which must be provided by a farmer to irrigate a number of fields.

The apparatus of the present invention typically can be operated by a crew of two workers with one of the workers climbing on and off the tractor to operate the same when it is required. When utilizing the apparatus, at least one of the workers stands in a position in close proximity to the handle 57 so that it can be operated quickly. By positioning the handle 57 in the manner shown in FIGS. 2 and 3, it is readily apparent that it can be grasped rapidly if necessary to stop operation of the motor 46.

By way of example, this apparatus has been utilized to pull lengths of sprinkler pipe from entire fields. A crew can pull a 30 foot length of sprinkler pipe approximately every 10 seconds. In other words, approximately 5 pipes can be pulled each minute. The machine is designed so it will pull one half mile of interconnected sprinkler pipe.

After the apparatus has been utilized for pulling pipe from a field, the tractor with its three-point hitch can be disconnected from the side of the elongate framework 11 and then connected to the front hitch 27 of the apparatus and pulled to another location or field where the pipe can be removed immediately after irrigation has occurred. Thus it can be seen that with a single apparatus for removing pipe, a number of fields can have the pipe removed therefrom in successive days making it possible to cover large acreages of land for irrigation for germination of seeds while at the same time minimizing the amount of sprinkler pipe required.

The use of the apparatus for removing pipe from the field has a number of advantages. First, as pointed out above, it makes possible a substantial cost saving by immediately withdrawing pipe from the field after sprinkling has occurred. In addition, by pulling the pipe while the field is still wet, it keeps the workers out of the field and prevents the workers from stepping on plants and compacting the soil.

It is apparent from the foregoing that there has been provided a novel apparatus which can be used for retrieving sprinkler pipe from a field by using a method which eliminates the necessity for workmen entering the field.

What is claimed is:

1. An apparatus for removing sprinkler pipe from a field in which the sprinkler pipe is disposed in rows in the field with the sprinkler pipe in each row being formed of serially connected lengths of sprinkler pipe, comprising: an elongate framework, ground engaging means carried by the framework, means on the framework for pulling a length pipe longitudinally of the framework, motive means, control means for connecting and disconnecting said motive means to said pulling means, and at least one attachment carried by said pulling means, said attachment being adapted to engage a leading end of the sprinkler pipe whereby as the pulling means is advanced the serially connected lengths of pipe are withdrawn from the field without the apparatus entering therein and carried onto the elongate framework.

2. Apparatus as in claim 1 together with means carried by the rear extremity of the framework for centering the sprinkler pipe as it is withdrawn from the field over the chain.

3. Apparatus as in claim 2 wherein said means for centering the sprinkler pipe includes yieldably urged guide members which are adapted to engage the sprinkler pipe.

4. Apparatus as in claim 1 wherein said control means includes a control handle disposed near the rear extremity of the elongate framework which is adapted to be readily grasped by the operator.

5. Apparatus as in claim 1 wherein said sprocket means are provided with rings on opposite sides of the same for supporting the chain to minimize wear to the sprocket means.

6. Apparatus as in claim 1 wherein said control means includes a control valve connected to said control lever, said control valve being adapted to be connected a source of hydraulic fluid and wherein said motive means includes a hydraulic motor and means for supplying hydraulic fluid from said control valve to said hydraulic motor.

7. Apparatus as in claim 1 together with means for moving said ground engaging wheels between a position which is disposed below the framework and a position which is disposed above the framework.

8. Apparatus as in claim 7 together with a support stand carried by the rear extremity of the framework and means carried by the forward extremity of the framework for supporting the forward and rear extremities of the framework in an elevated position when the ground engaging means is disposed above the ground.

9. Apparatus as in claim 1 together with a first hitch mounted on the forward extremity of the framework and a second hitch mounted on the side of the framework, said first and second hitches being adapted to be coupled to a tractor.

10. Apparatus as in claim 1 wherein said framework has a length which is at least as long as a length of sprinkler pipe.

11. Apparatus as in claim 1 wherein at least two pipe attachment brackets are carried by the pulling means at spaced apart locations thereof.

12. Apparatus as in claim 1 wherein said pulling means includes sprocket means rotatably mounted on the framework and an endless chain mounted on the sprocket means, said motive means to be connected to and disconnected from said sprocket means.

* * * * *

UNITED STATES PATENT AND TRADEMARK OFFICE
CERTIFICATE OF CORRECTION

PATENT NO. : 4,553,900
DATED : November 19, 1985
INVENTOR(S) : Miller et al.

It is certified that error appears in the above—identified patent and that said Letters Patent is hereby corrected as shown below:

At Column 2, line 62, the word "tub" should be --stub--.

At Column 5, line 8, the numeral "8" should be --98--.

At Column 5, line 14, the numeral "7" should be --97--.

Signed and Sealed this

Fourth Day of March 1986

[SEAL]

Attest:

DONALD J. QUIGG

Attesting Officer

Commissioner of Patents and Trademarks